(12) United States Patent
Lee et al.

(10) Patent No.: US 11,146,089 B2
(45) Date of Patent: Oct. 12, 2021

(54) ENERGY HARVESTING SYSTEM USING LINEAR KINETIC ENERGY BASED ON INDUCTION POWER GENERATION

(71) Applicant: SUN HST Co., Ltd., Ulsan (KR)

(72) Inventors: Jin Yong Lee, Ulsan (KR); Jeong Hun Lee, Ulsan (KR); Su Jin Lee, Ulsan (KR); Myoung Hoon Choi, Ulsan (KR); Jeong Hwan Ahn, Ulsan (KR)

( * ) Notice: Subject to any disclaimer, the term of this patent is extended or adjusted under 35 U.S.C. 154(b) by 0 days.

(21) Appl. No.: 17/105,690

(22) Filed: Nov. 27, 2020

(65) Prior Publication Data
US 2021/0175730 A1 Jun. 10, 2021

(30) Foreign Application Priority Data
Dec. 4, 2019 (KR) .......................... 10-2019-0159765

(51) Int. Cl.
*H02J 3/38* (2006.01)
*H02J 7/00* (2006.01)
*H02J 50/00* (2016.01)

(52) U.S. Cl.
CPC .......... *H02J 7/0068* (2013.01); *H02J 50/001* (2020.01); *H02J 50/005* (2020.01)

(58) Field of Classification Search
CPC ........ H02J 1/10; H02J 3/38; H02J 4/00; H02J 5/00; G06F 11/2015
USPC .......................................................... 307/19
See application file for complete search history.

(56) References Cited

U.S. PATENT DOCUMENTS

| 2010/0230965 | A1* | 9/2010 | Pitre | ......................... F03D 9/25 |
| | | | | 290/42 |
| 2019/0316562 | A1* | 10/2019 | Sathyanarayanan | .... F16H 41/24 |
| 2020/0109696 | A1* | 4/2020 | Chu | ........................ F03D 15/00 |

FOREIGN PATENT DOCUMENTS

| JP | 2018-39038 | 3/2018 |
| KR | 10-1860136 | 5/2018 |

OTHER PUBLICATIONS

English Specification of 2018-39038.
English Specification of 10-1860136.

* cited by examiner

*Primary Examiner* — Quan Tra
(74) *Attorney, Agent, or Firm* — Antonio Ha & U.S. Patent, LLC (57) ABSTRACT

According to an embodiment, there is provided an energy harvesting system using linear kinetic energy based on induction power generation. According to various embodiments, there may be provided an energy harvesting system using linear kinetic energy based on induction power generation, which may minimize the occasions of replacing or recharging the battery in battery-powered products by using the force or energy generated from a linearly reciprocating machine or device and may allow the battery to be charged when linear kinetic energy is generated and, otherwise, discharged, using an automatic battery charging/discharging system.

7 Claims, 12 Drawing Sheets

ENERGY HARVESTING SYSTEM USING LINEAR KINETIC ENERGY BASED ON INDUCTION POWER GENERATION

CROSS-REFERENCE TO RELATED APPLICATION(S)

This application claims priority to Korean Patent Application No. 10-2019-0159765 filed in the Korean Intellectual Property Office on Dec. 4, 2019, the disclosure of which is incorporated by reference herein in its entirety.

TECHNICAL FIELD

Embodiments of the disclosure relate to an energy harvesting system using linear kinetic energy based on induction power generation.

DISCUSSION OF RELATED ART

Numerous sensors are used in industrial sites. In the past, power for sensors mostly comes from a wired connection but it gradually tends to use wireless connections due to the burden of material costs and wiring work. Wireless devices include a battery and, when the battery is discharged, it needs to be replaced or recharged. Although recent products consume low power, the cycle of battery replacement is bound to be about 2-3 years.

Sensors used in industrial sites are changing from wired to wireless but are still not in wide use because of their short service life. Even if the lifespan is long, the data transmission period is too long, e.g., once every 30 minutes or once every hour, and the data transmission period is not continuous. In the case where real-time transmission of sensor data is needed, the battery, which has a short battery life, may be required to be replaced or recharged for reuse. While the battery is replaced or recharged, the industrial device using the battery is supposed to stop operate, thus causing loss.

The description disclosed in the Background section is only for a better understanding of the background of the invention and may also include information which does not constitute the prior art.

SUMMARY

According to an embodiment, there is provided an energy harvesting system using linear kinetic energy based on induction power generation. According to various embodiments, there may be provided an energy harvesting system using linear kinetic energy based on induction power generation, which may minimize the occasions of replacing or recharging the battery in battery-powered products by using the force or energy generated from a linearly reciprocating machine or device and may allow the battery to be charged when linear kinetic energy is generated and, otherwise, discharged, using an automatic battery charging/discharging system.

According to an embodiment, an energy harvesting system using linear kinetic energy based on induction power generation comprises a shaft fixture fixed to a head of a cylinder shaft in linear motion, a shock-absorbing spring structure coupled to the shaft fixture, a rack gear extending from the shock-absorbing spring structure to a cylinder body, a body fixture fixed to the cylinder body, a spur gear equipped in the body fixture and rotatably coupled with the rack gear, a power generator coupled with the spur gear to generate electricity, and a battery electrically connected with the power generator, charged by the power generator, and supply power to a sensor mounted on the cylinder body.

The shaft fixture includes a first end plate having an internal space and a fixing plate provided in the internal space of the first end plate. The shock-absorbing spring structure includes a second end plate, a first guide extending from the second end plate and coupled to the internal space of the first end plate, and a second guide extending from the second end plate, connected to the first guide, and coupled to the fixing plate. A shock-absorbing spring is provided between the second end plate and the fixing plate, inside the second guide.

The fixing plate is fixed to the first end plate via a connector. The second guide has a cut hole in a portion corresponding to the connector.

The rack gear extends from the second end plate and penetrates the body fixture.

The power generator includes a reduction geared power generator.

An alternating current (AC)-to-direct current (DC) converter is connected to the power generator. The AC-to-DC converter supplies DC power to the battery and the sensor.

The energy harvesting system may further comprise a battery monitoring system. The battery monitoring system manages a charging voltage of the battery by the AC-to-DC converter and a discharging voltage, to the sensor, of the battery.

According to embodiments, there is provided an energy harvesting system using linear kinetic energy based on induction power generation. According to various embodiments, there may be provided an energy harvesting system using linear kinetic energy based on induction power generation, which may minimize the occasions of replacing or recharging the battery in battery-powered products by using the force or energy generated from a linearly reciprocating machine or device and may allow the battery to be charged when linear kinetic energy is generated and, otherwise, discharged, using an automatic battery charging/discharging system.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Hereinafter, embodiments of the present invention are described in detail with reference to the accompanying drawings.

Embodiments of the disclosure are provided to thoroughly explain the disclosure to those skilled in the art, and various modifications may be made thereto, and the scope of the present invention is not limited thereto. Embodiments of the disclosure are provided to fully and thoroughly convey the spirit of the present invention to those skilled in the art.

As used herein, the thickness and size of each layer may be exaggerated for ease or clarity of description. The same reference denotations may be used to refer to the same or substantially the same elements throughout the specification and the drawings. As used herein, the term "A and/or B" encompasses any, or one or more combinations, of A and B. It will be understood that when an element or layer is referred to as being "on," "connected to," "coupled to," or "adjacent to" another element or layer, it can be directly on, connected, coupled, or adjacent to the other element or layer, or intervening elements or layers may be present.

The terms as used herein are provided merely to describe some embodiments thereof, but not intended as limiting the present invention. As used herein, the singular forms "a," "an," and "the" are intended to include the plural forms as well, unless the context clearly indicates otherwise. As used herein, the term "comprise," "include," and/or "comprising" or "including" does not exclude the presence or addition of one or more other components, steps, operations, and/or elements than the component, step, operation, and/or element already mentioned.

As used herein, the terms "first" and "second" may be used to describe various members, parts, regions, areas, layers, and/or portions, but the members, parts, regions, areas, layers, and/or portions are not limited thereby. These terms are used merely to distinguish one member, part, region, area, layer, or portion from another. Accordingly, the term "first member," "first part," "first region," "first area," "first layer," or "first portion" described herein may denote a "second member," "second part," "second region," "second area," "second layer," or "second portion" without departing from the teachings disclosed herein.

The terms "beneath," "below," "lower," "under," "above," "upper," "on," or other terms to indicate a position or location may be used for a better understanding of the relation between an element or feature and another as shown in the drawings. However, embodiments of the present invention are not limited thereby or thereto. For example, where a lower element or an element positioned under another element is overturned, then the element may be termed as an upper element or element positioned above the other element. Thus, the term "under" or "beneath" may encompass, in meaning, the term "above" or "over."

Main elements used for energy harvesting may include piezoelectric elements, Peltier elements, electromagnetic induction, or solar panels. Research for energy harvesting focuses primarily on raising the efficiency of the element. However, such an element may not be enough to replace a battery. Such elements may also be significantly influenced by the ambient environment. Piezoelectric elements require an external force for deformation, and Peltier elements may require a large difference in temperature between two opposite sides to have increased efficiency. Solar panels are used only in bright places. Representatively, power generation stations adopt electromagnetic induction and solar power generation. Electromagnetic induction and solar power generation elements may produce more power as compared with piezoelectric and Peltier elements. However, solar panels require a periodic clean-up to prevent contamination thereon and, when heated for a long time, their efficiency may be lowered. Electromagnetic induction may be used regardless of the surrounding environment as long as it has the energy of the force to drive the turbine.

FIGS. 1A, 1B, 1C, and 1D are views illustrating various example energy harvesting systems according to an embodiment.

Figure 1A:
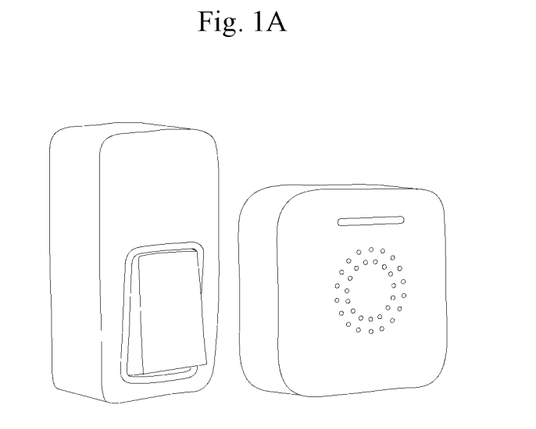
FIGS. 1A, 1B, 1C, and 1D are views illustrating various example energy harvesting systems according to an embodiment.

Self-Powered Doorbell (Refer to FIG. 1A)

A transmitter wirelessly transmits a signal to a receiver using the power generated via electromagnetic induction thereinside while a button of the doorbell is pressed and, upon receiving the signal, the receiver drives a speaker to sound. The transmitter of the doorbell may be semipermanently used. However, the transmitter is operated only when the button is pressed, and the receiver is supplied power from the power outlet.

Figure 1B:
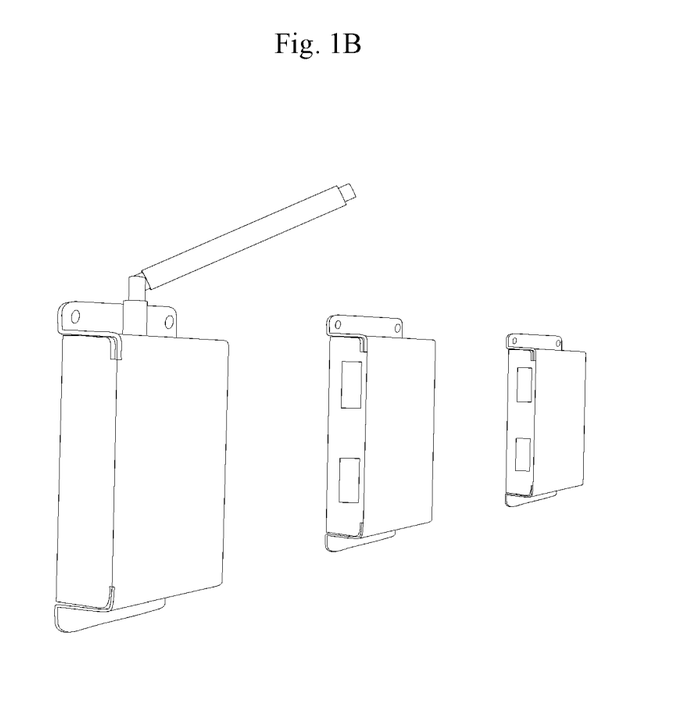

Wireless Temperature/Humidity Sensor (Refer to FIG. 1B)

The battery in the wireless sensor is a primary cell which is not rechargeable. The use time is significantly varied depending on the period of communication.

Figure 1C:
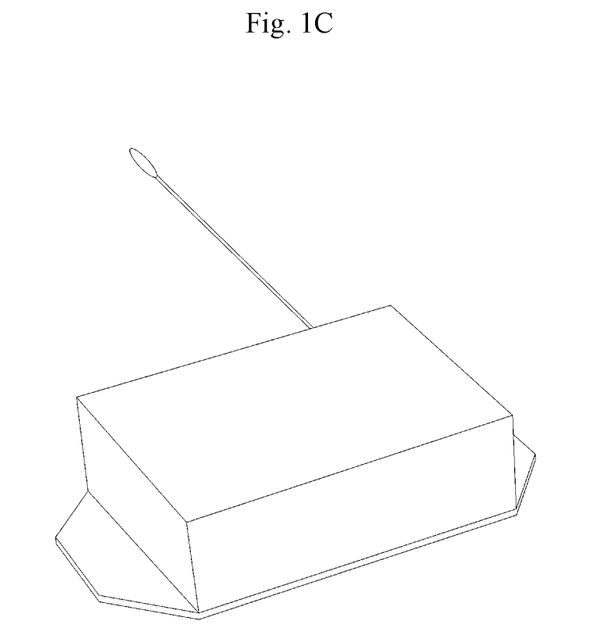

Wireless Vibration Measuring Sensor (Refer to FIG. 1C)

The battery lifespan is about 6 years to about 8 years, and the data transmission period is one hour. The sensor transmits data once every hour.

Figure 1D:
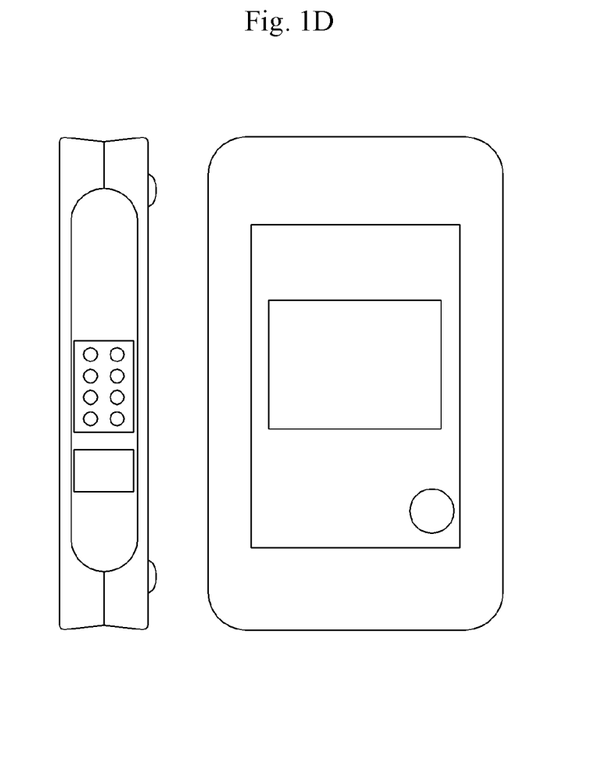

Thermocouple (Refer to FIG. 1D)

A thermocouple is an industrial temperature sensor for measuring temperatures as high as 300 degrees Celsius. The thermocouple may wirelessly transmit data, and a gateway for receiving the data may use a power outlet. Such wireless sensors have a battery lifespan of about 6 months.

Figure 2A:
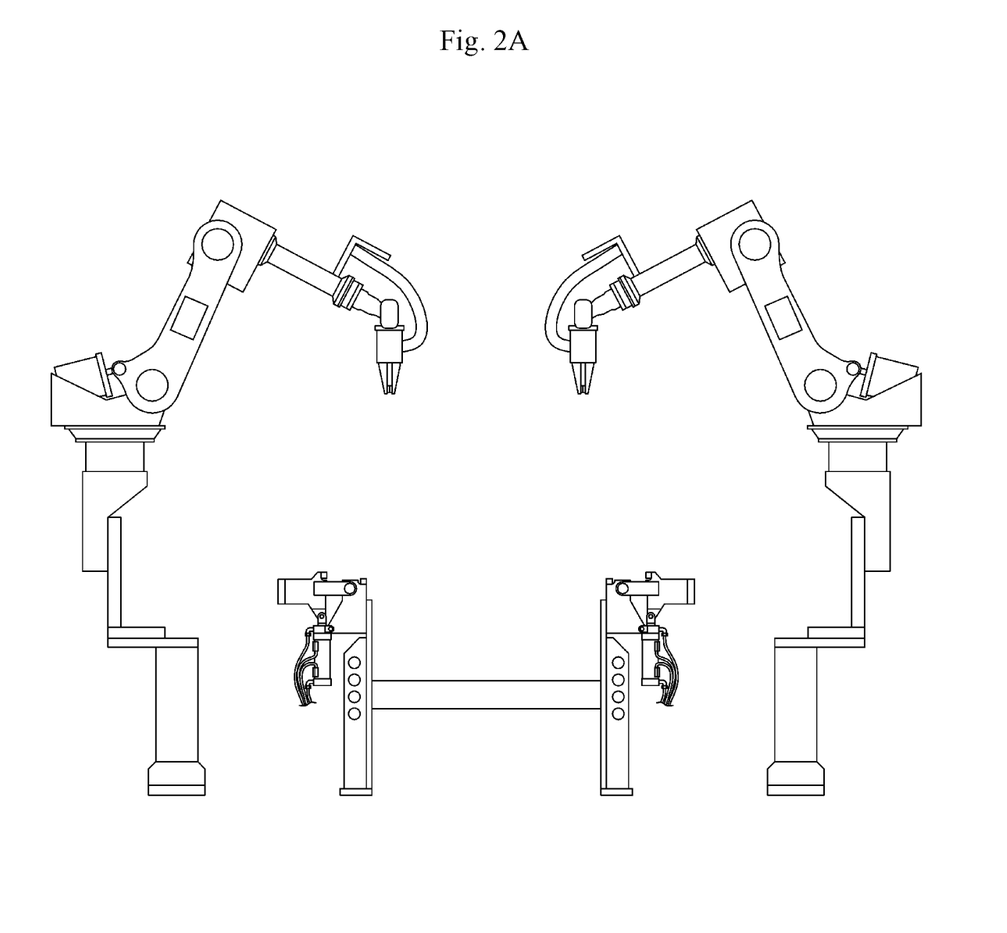
FIGS. 2A and 2B are views illustrating an example cylinder equipped with an energy harvesting system using linear kinetic energy based on induction power generation according to an embodiment.
Figure 2B:
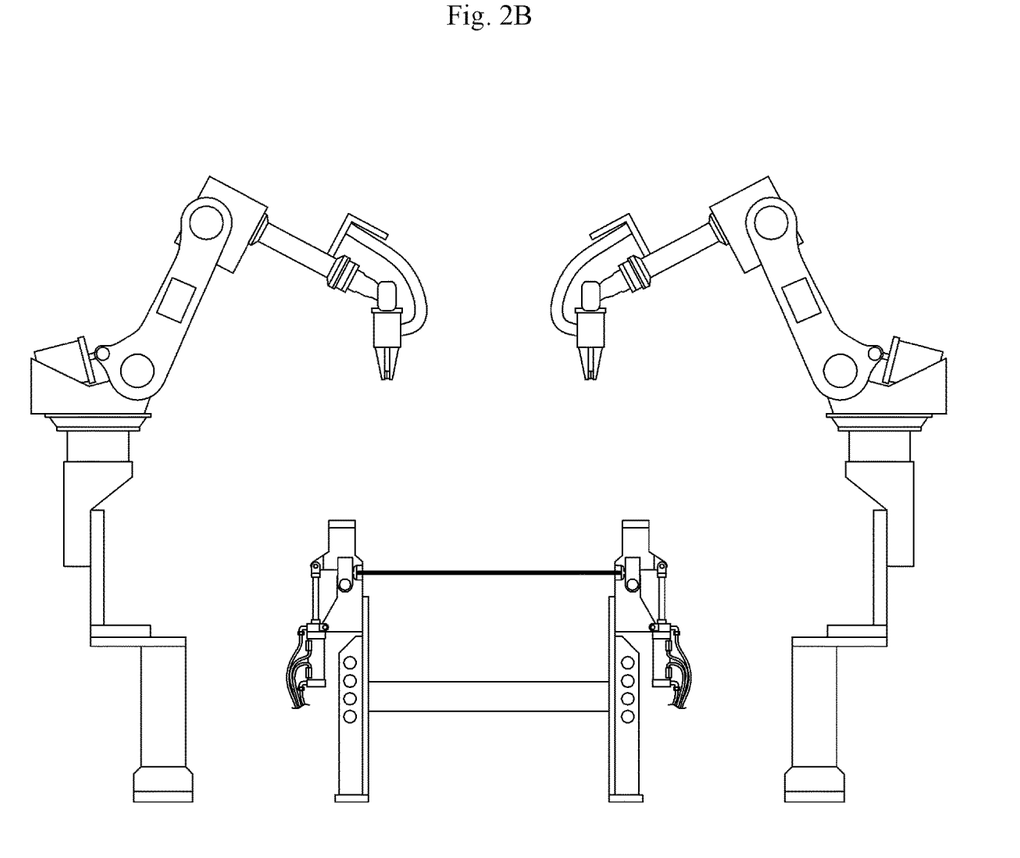

FIGS. 2A and 2B are views illustrating an example cylinder equipped with an energy harvesting system using linear kinetic energy based on induction power generation according to an embodiment.

As shown in FIGS. 2A and 2B, the energy harvesting system using linear kinetic energy based on induction power generation, according to an embodiment, may wirelessly supply power to magnetic sensors that check the operation state of the pneumatic or hydraulic cylinders used in the clamp jigs in an automobile production plant. The clamp jig is a device to hold the panel to perform work, such as welding or applying silicon.

FIG. 2A illustrates an example in which a car side panel is placed on the jig to weld the side panel in which case the cylinder is in an open state (backed-off state). FIG. 2B illustrates an example in which a panel fixed to the jig is welded in which case the cylinder is in a closed state (advanced state).

Figure 3:
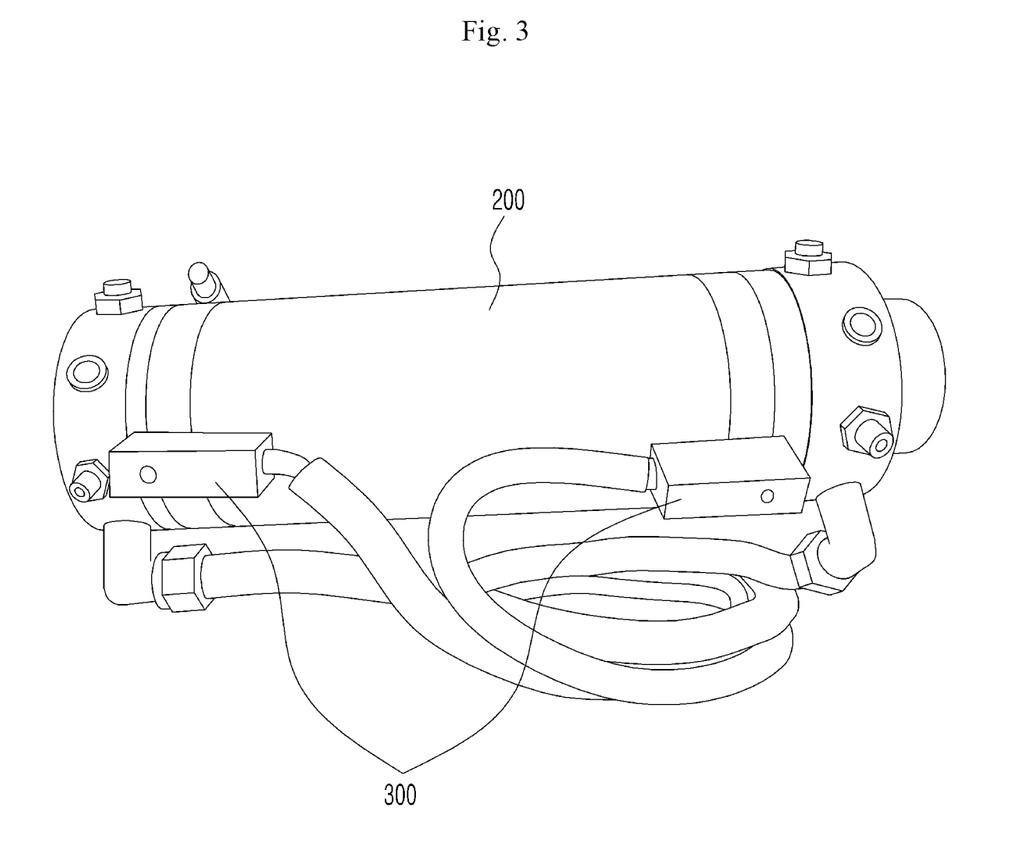
FIG. 3 is a view illustrating an example cylinder equipped with an energy harvesting system using linear kinetic energy based on induction power generation according to an embodiment.

FIG. 3 is a view illustrating an example cylinder equipped with an energy harvesting system using linear kinetic energy based on induction power generation according to an embodiment.

Referring to FIG. 3, magnets may be inserted in the cylinder 200 and may be sensed by the magnetic sensors 300 to thereby sense whether the cylinder 200 is in the advanced or backed-off state.

Referring to FIG. 3, two magnetic sensors 300 may be positioned on both sides of the body of the cylinder 200 and, by the magnetic field values sensed by the magnetic sensors 300, it may be known or determined whether the cylinder 200 is in the advanced or backed-off state. When one or two cylinders are used, there may be no need for recharging the battery in a wireless manner.

However, when more cylinders are used, two magnetic sensors are attached onto each cylinder and may consume more power and may thus be required to be connected to a separate power source in which case more costs and time may be consumed. Thus, it may be required to reduce material costs and work time for connecting to a power source.

Figure 4:
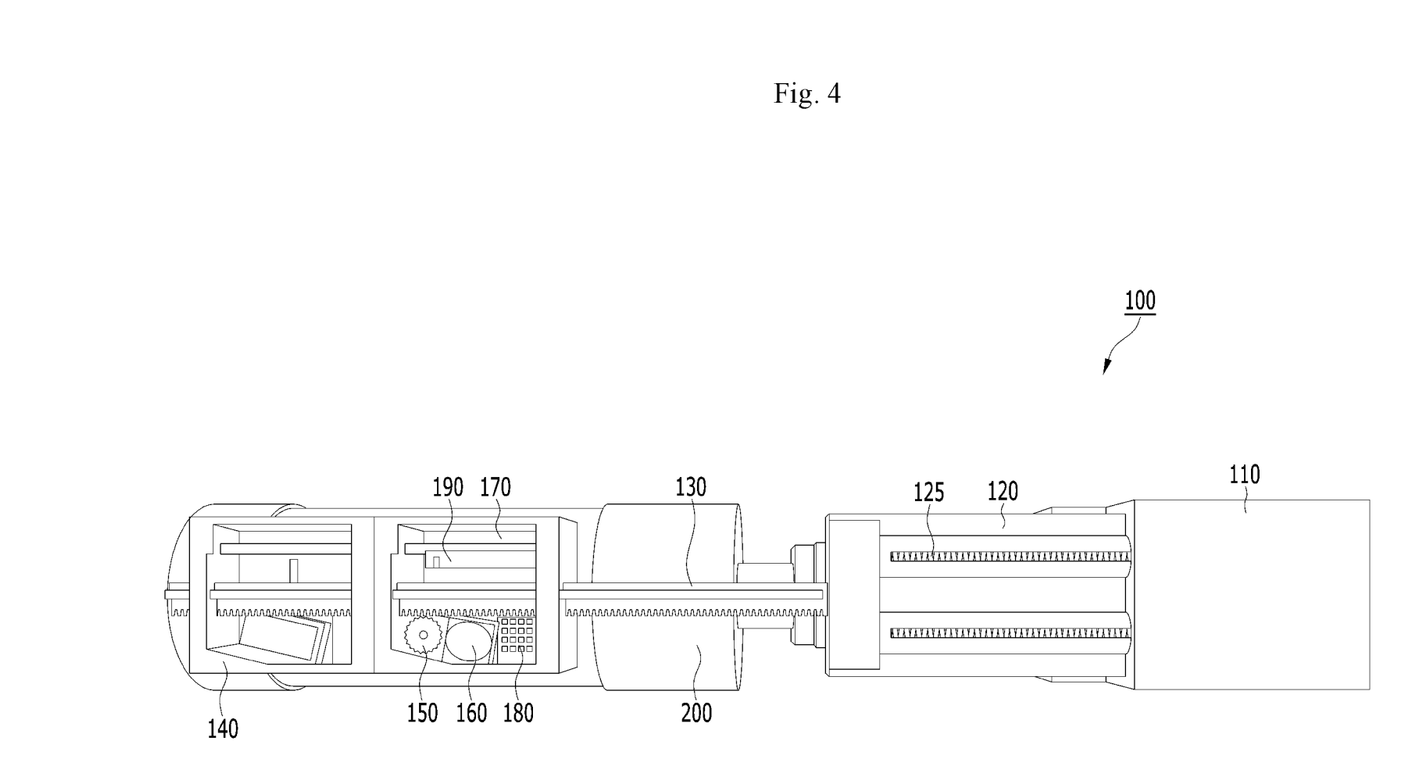
FIG. 4 is a view illustrating an energy harvesting system using linear kinetic energy based on induction power generation according to an embodiment.

FIG. 4 is a view illustrating an energy harvesting system using linear kinetic energy based on induction power generation according to an embodiment.

Referring to FIG. 4, according to an embodiment, an energy harvesting system 100 using linear kinetic energy based on induction power generation may include a shaft fixture 110, a shock-absorbing spring structure 120, a rack gear 130, a body fixture 140, a spur gear 150, a power generator 160, and a battery 170.

According to an embodiment, the energy harvesting system 100 using linear kinetic energy based on induction power generation may further include an alternating current (AC)-to-direct current (DC) converter 180 (or a full-wave rectification circuit) and a battery monitoring system (BMS) 190 (or a constant voltage circuit).

The shaft fixture 110 may be fixed to a cylinder shaft 210 in linear motion, in particular, the head 211 of the shaft, via a fixing member, e.g., a bolt/nut or screw. Therefore, when the cylinder shaft 210 reciprocates linearly from the cylinder body 220, the shaft fixture 110 also reciprocates linearly.

The shock-absorbing spring structure 120 may be coupled to the shaft fixture 110, with a spring 125 interposed therebetween. The shock-absorbing spring structure 120 performs a reciprocating linear motion in a time-delayed state when the shaft fixture 110, along with the cylinder shaft 210, linearly reciprocates. The shock-absorbing spring structure 120 is not damaged or broken even when the shaft fixture 110 linearly reciprocates at high speed.

The rack gear 130 may substantially linearly extend from the shock-absorbing spring structure 120 to the cylinder body 220. The rack gear 130, along with the cylinder shaft 210, linearly reciprocates. The rack gear 130 may be provided with a plurality of teeth 131 along one side thereof, which are engaged with the spur gear 150, thereby rotating the spur gear 150.

The body fixture 140 may be fixed to the cylinder body 220, which linearly reciprocates the cylinder shaft 210, via a fixing member. The rack gear 130 may penetrate the body fixture 140 and linearly reciprocate.

The spur gear 150 may be rotatably installed in the body fixture 140 and be engaged with the rack gear 130 to rotate. In other words, the spur gear 150 converts the linear motion of the rack gear 130 into circular motion or rotational motion.

The power generator 160 may be engaged with the spur gear 150 to generate electricity (e.g., AC electricity). In other words, as the rack gear 130 linearly reciprocates, the spur gear 150 also reciprocately rotates, allowing the power generator 160 to generate AC electricity.

The battery 170 is electrically connected with the power generator 160 and is charged by the power generator 160 and may supply (discharge) power to the magnetic sensors mounted on the cylinder body 220. According to an embodiment, the battery 170 may include a lithium ion battery, a lithium ion polymer battery, or a lithium polymer battery. According to an embodiment, the battery 170 may include a super capacitor or other capacitors.

The AC-to-DC converter 180 may be electrically connected between the power generator 160 and the battery 170. The AC-to-DC converter 180 may convert the AC current generated by the power generator 160 into DC current and charge the battery 170 with the DC current and supply the DC current to the sensors.

The battery monitoring system (BMS) 190 may have an input terminal connected to the AC-to-DC converter 180 and an output terminal connected to the sensor. The battery monitoring system (BMS) 190 allows the charging voltage of the battery 170 to be controlled by the AC-to-DC converter 180 and allows the discharging voltage of the battery 170, which is consumed by the sensor, to be controlled.

As such, the energy harvesting system 100 using linear kinetic energy based on induction power generation, according to an embodiment, charges the battery 170, on its own, using the force and energy generated when the pneumatic (or hydraulic) cylinder 200 linearly reciprocates, thus allowing for semipermanent use while reducing the communication period of the sensor, unlike the conventional products.

Figure 5A:
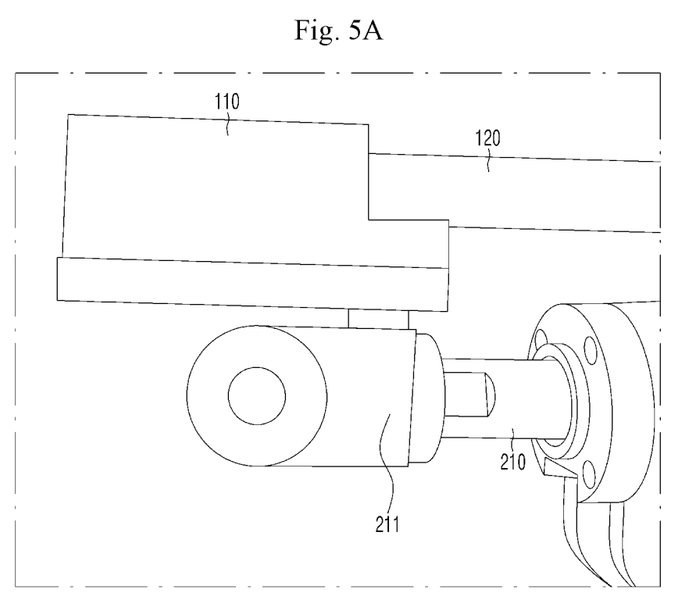
FIGS. 5A, 5B, and 5C are views illustrating a shift fixture and a cylinder head of an energy harvesting system using linear kinetic energy based on induction power generation according to an embodiment.
Figure 5B:
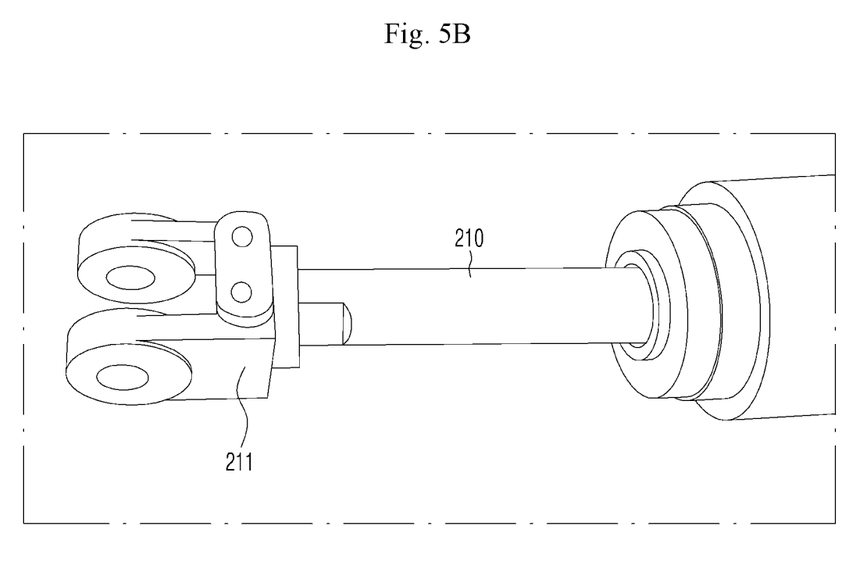
Figure 5C:
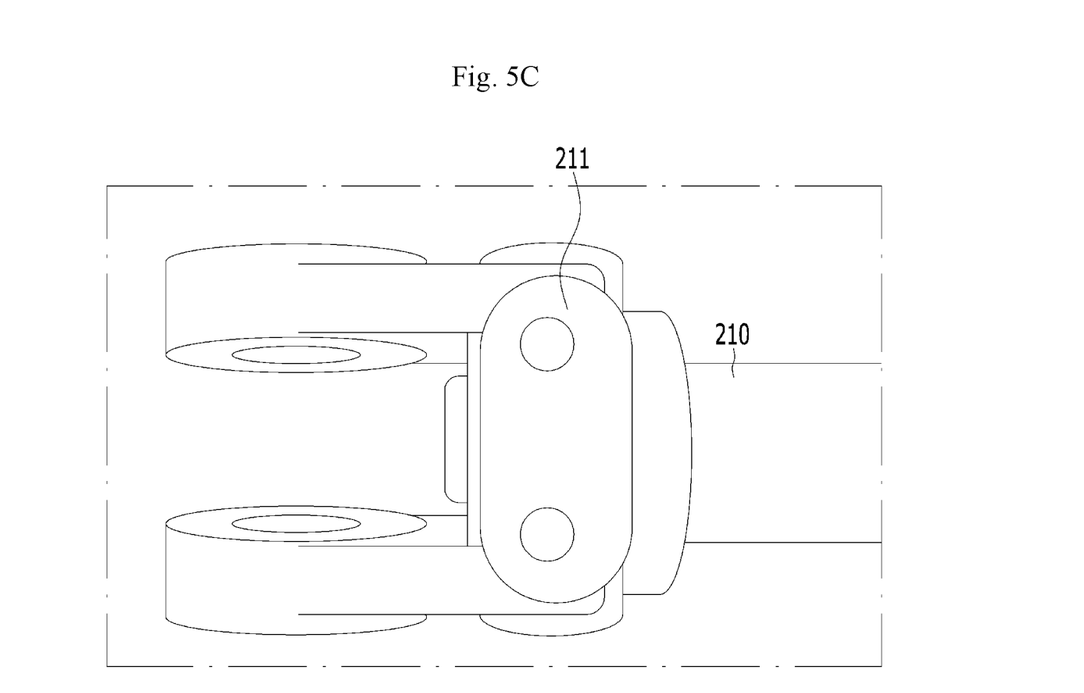

FIGS. 5A, 5B, and 5C are views illustrating a shift fixture 110 and a cylinder head 211 of an energy harvesting system 100 using linear kinetic energy based on induction power generation according to an embodiment.

Referring to FIGS. 5A to 5C, according to an embodiment, in the energy harvesting system 100 using linear kinetic energy based on induction power generation, a lower end of the shaft fixture 110 may be fixed to the head 211 of the cylinder shaft 210 via a fixing member, e.g., a bolt/nut or screw. Thus, as the cylinder shaft 210 linearly reciprocates, the shaft fixture 110 also reciprocates linearly.

Figure 6:
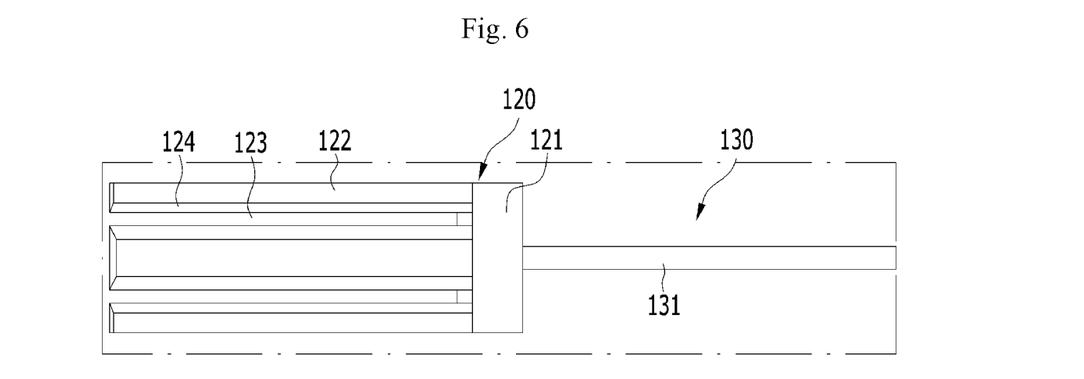
FIG. 6 is a view illustrating a shock-absorbing spring structure and a rack gear of an energy harvesting system using linear kinetic energy based on induction power generation according to an embodiment.

FIG. 6 is a view illustrating a shock-absorbing spring structure 120 and a rack gear 130 of an energy harvesting system 100 using linear kinetic energy based on induction power generation according to an embodiment.

Referring to FIG. 6, in the energy harvesting system 100 using linear kinetic energy based on induction power generation, according to an embodiment, the shock-absorbing spring structure 120 and the rack gear 130 may be integrally formed with each other. According to an embodiment, the shock-absorbing spring structure 120 and the rack gear 130 may be formed individually and be then assembled together.

According to an embodiment, the shock-absorbing spring structure 120 may include a second end plate 121, a first guide 122 extending from the second end plate 121 straight in a first direction thereof and a second guide 124 extending from the second end plate 121, connected with the first guide 122, and having a cut hole (or groove) 123.

The rack gear 130 may extend substantially linearly from the second end plate 121 in a second direction, which is opposite to the first direction, and the rack gear 130 may have a plurality of teeth 131 on one side surface thereof.

Figure 7:
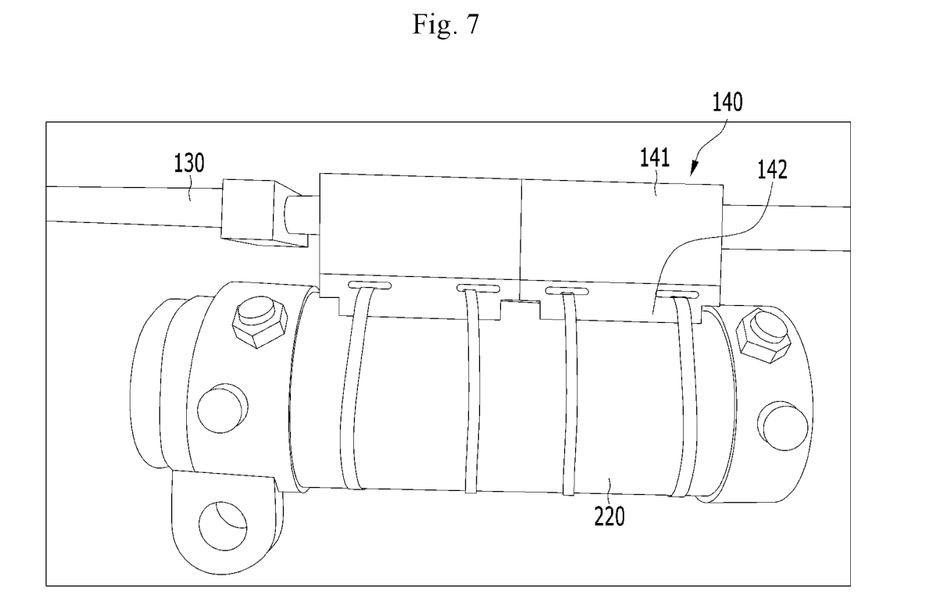
FIG. 7 is a view illustrating a body fixture of an energy harvesting system using linear kinetic energy based on induction power generation according to an embodiment.

FIG. 7 is a view illustrating a body fixture 140 of an energy harvesting system 100 using linear kinetic energy based on induction power generation according to an embodiment.

Referring to FIG. 7, in the energy harvesting system 100 using linear kinetic energy based on induction power generation, according to an embodiment, the body fixture 140 may be fixed to the cylinder body 220.

According to an embodiment, the body fixture 140 may include an upper plate structure 141 and a lower plate structure 142. According to an embodiment, the rack gear 130 may penetrate and linearly reciprocate through the upper plate structure 141. The upper plate structure 141 may include or receive the spur gear 150, the power generator 160, the AC-to-DC converter 180, the battery monitoring system (BMS) 190, and the battery 170. The lower plate structure 142 may be seated on the lower plate structure 142, and the lower plate structure 142 may be fixed to the cylinder body 220 via a fixing member, e.g., multiple cable ties.

Figure 8:
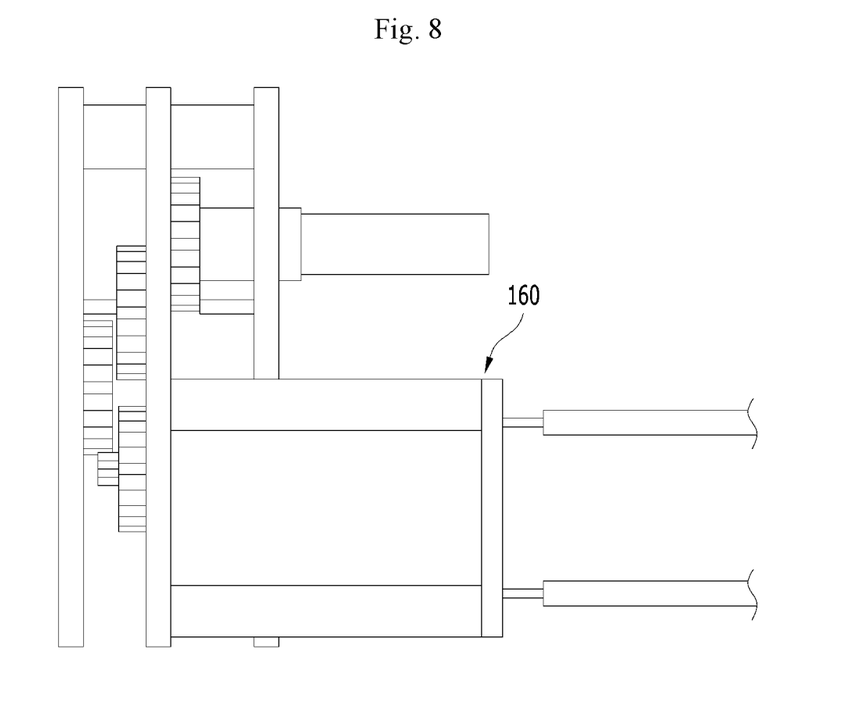
FIG. 8 is a view illustrating a power generator of an energy harvesting system using linear kinetic energy based on induction power generation according to an embodiment.

FIG. 8 is a view illustrating a power generator 160 of an energy harvesting system 100 using linear kinetic energy based on induction power generation according to an embodiment.

Referring to FIG. 8, in the energy harvesting system 100 using linear kinetic energy based on induction power generation, according to an embodiment, the power generator 160 may include a reduction geared power generator (or motor) 160. According to an embodiment, the reduction geared power generator 160 may have a reduction ratio of about 150:1. For example, when the power generator 160 rotates 150 times, the shaft coupled with the power generator 160 rotates once. In other words, when the shaft coupled to the spur gear 150 rotates once, the power generator 160 rotates 150 times. Therefore, even at a small number of revolutions, the power generator 160 may rotate an increased number of times and, thus, the power generator 160 may generate more power as much.

Figure 9A:
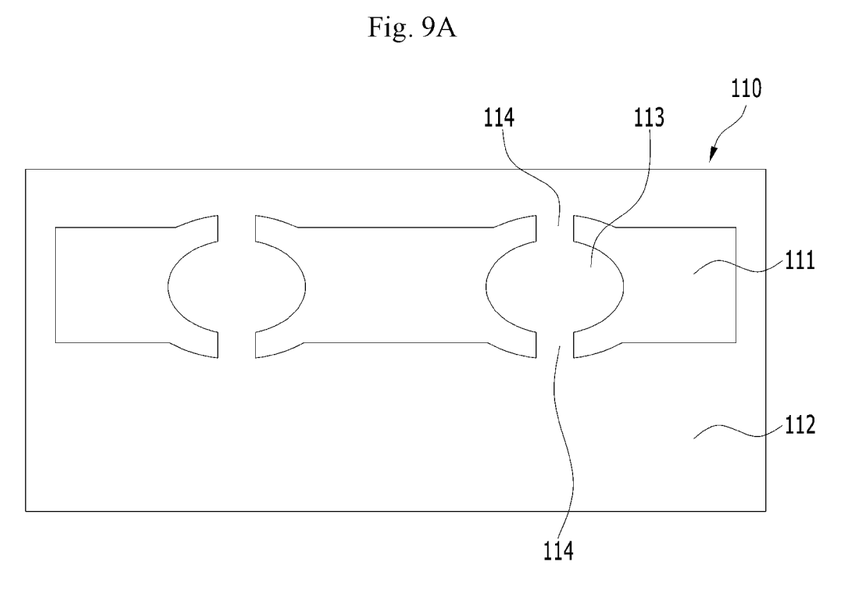
FIGS. 9A, 9B, and 9C are views illustrating a coupled state of a shaft fixture and a shock-absorbing spring structure of an energy harvesting system using linear kinetic energy based on induction power generation according to an embodiment.
Figure 9B:
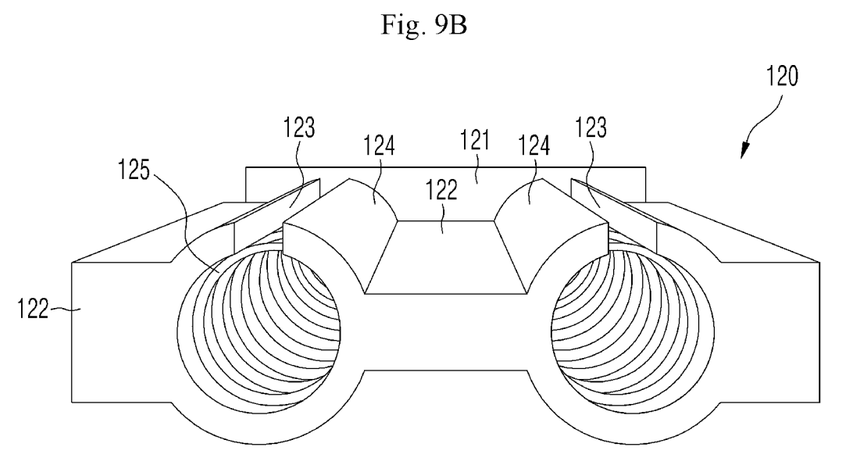
Figure 9C:
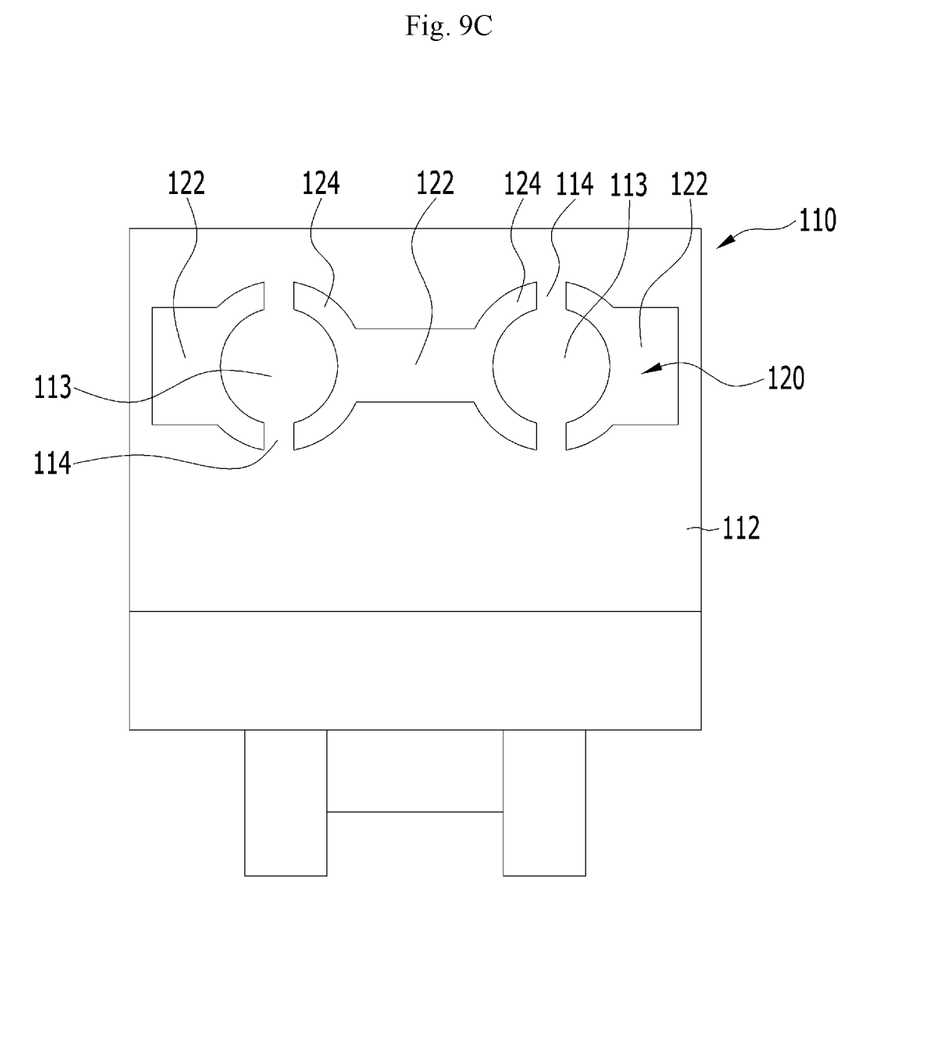

FIGS. 9A, 9B, and 9C are views illustrating a coupled state of a shaft fixture 110 and a shock-absorbing spring structure 120 of an energy harvesting system using linear kinetic energy based on induction power generation according to an embodiment.

Referring to FIGS. 9A to 9C, the shaft fixture 110 may include a first end plate 112 having an empty space 111 thereinside and a substantially disc-shaped fixing plate 113 provided in the first end plate 112.

The disc-shaped fixing plate 113 may be fixed to the first end plate 112 via a connector 114. According to an embodiment, a pair of fixing plates 113 may be provided, and the connector 114 may be formed on each of the top and bottom of the fixing plate 113.

As described above, the shock-absorbing spring structure 120 may include a second end plate 121, a straight line-shaped first guide 122 extending from the second end plate 121 and coupled to a space 111 of the first end plate 112, and a substantially circular ring-shaped second guide 124 extending from the second end plate 121, connected to the first guide 122, and coupled to the fixing plate 113. The second guide 124 may further include a cut hole (or groove) 123 formed in the portion corresponding to the connector 114. A shock-absorbing spring 125 may be provided inside the second guide 124, between the second end plate 121 and the fixing plate 113.

Thus, the first guide 122 of the shock-absorbing spring structure 120 may be fitted into the internal, empty space 111 of the shaft fixture 110, and the second guide 124 of the shock-absorbing spring structure 120 is coupled to the fixing plate 113 of the shaft fixture 110. Shocks may be absorbed by the shock-absorbing spring 125 interposed between the shock-absorbing spring structure 120 and the shaft fixture 110. In other words, when the cylinder shaft 210 linearly moves from the cylinder body 220, the shock-absorbing spring structure 120 and the shaft fixture 110 may be shock-absorbed by the shock-absorbing spring 125, preventing damage to the shock-absorbing spring structure 120 and the shaft fixture 110.

Without the shock-absorbing spring 125, the above-described reduction geared power generator 160 might be rotated at the speed of the cylinder 200 being closed or open. The time for the cylinder 200 to be open or closed may be about 1 second or less and, as such, the operation may occur momentarily. Thus, the gears may not be durable enough to withstand the force, so that the reduction geared power generator 160 may be damaged or broken.

To address this, the spring 125 may be used. The spring 125 may be compressed by the force that is momentarily exerted, absorb the force, and then push it out with its tension. In contrast, when the spring 125 is momentarily pulled, the spring 125 may extend, absorb the force, and the gradually pull with its tension. As such, the spring 125 performs shock-absorbing.

Figure 10:
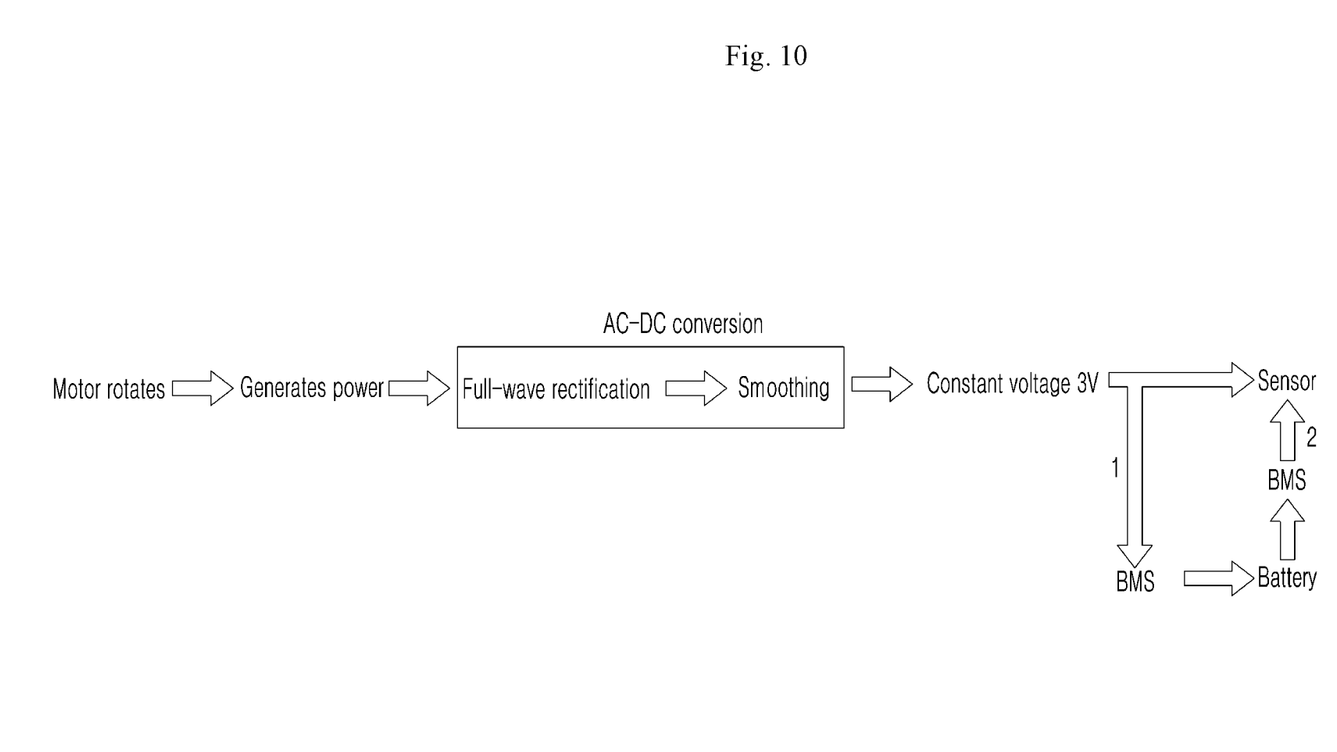
FIG. 10 is a view illustrating a circuit configuration of an energy harvesting system using linear kinetic energy based on induction power generation according to an embodiment.

FIG. 10 is a view illustrating a circuit configuration of an energy harvesting system 100 using linear kinetic energy based on induction power generation according to an embodiment.

Referring to FIG. 10, when the cylinder 200 operates, the power generator (or motor) 160 generates electric power or voltage. The generated voltage may be AC voltage. The AC voltage may be converted into DC voltage by the AC-to-DC converter 180 (e.g., a constant voltage circuit). The AC-to-DC converter 180 may output a constant DC voltage, e.g., 3V DC voltage.

Reference number 1 of FIG. 10 denotes operations when the electric power is generated. In the operations, the power output from the constant voltage circuit may drive the sensors, and the remaining power may be used to charge the battery 170. For example, when a power of 100 watts is generated, the sensors consume 40 watts, and the battery 170 is charged with the remaining 60 watts.

In this case, the battery monitoring system (BMS) 190 may protect an over-charge of the battery 170. In other words, the battery monitoring system (BMS) 190 allows the battery 170 not to be charged to a predetermined voltage or more, thus preventing the battery 170 from exploding or burning. Reference number 2 of FIG. 10 denotes an example in which power is supplied from the battery 170 to the sensors when no power is generated. In this case, the battery monitoring system (BMS) 190 may protect an over-discharge of the battery 170. In other words, the battery monitoring system (BMS) 190 allows the battery 170 not to be discharged to a predetermined voltage or less, thus preventing the battery 170 from being degraded.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. An energy harvesting system using linear kinetic energy based on induction power generation, the energy harvesting system comprising:
   a shaft fixture fixed to a head of a cylinder shaft in linear motion;
   a shock-absorbing spring structure coupled to the shaft fixture;
   a rack gear extending from the shock-absorbing spring structure to a cylinder body;
   a body fixture fixed to the cylinder body;
   a spur gear equipped in the body fixture and rotatably coupled with the rack gear;
   a power generator coupled with the spur gear to generate electricity; and
   a battery electrically connected with the power generator, charged by the power generator, and supply power to a sensor mounted on the cylinder body.

2. The energy harvesting system of claim 1, wherein the shaft fixture includes a first end plate having an internal space and a fixing plate provided in the internal space of the first end plate, wherein the shock-absorbing spring structure includes a second end plate, a first guide extending from the second end plate and coupled to the internal space of the first end plate, and a second guide extending from the second end plate, connected to the first guide, and coupled to the fixing plate, and wherein a shock-absorbing spring is provided between the second end plate and the fixing plate, inside the second guide.

3. The energy harvesting system of claim 2, wherein the fixing plate is fixed to the first end plate via a connector, and wherein the second guide has a cut hole in a portion corresponding to the connector.

4. The energy harvesting system of claim 2, wherein the rack gear extends from the second end plate and penetrates the body fixture.

5. The energy harvesting system of claim 1, wherein the power generator includes a reduction geared power generator.

6. The energy harvesting system of claim 1, wherein an alternating current (AC)-to-direct current (DC) converter is connected to the power generator, and wherein the AC-to-DC converter supplies DC power to the battery and the sensor.

7. The energy harvesting system of claim 6, further comprising a battery monitoring system, wherein the battery monitoring system manages a charging voltage of the battery by the AC-to-DC converter and a discharging voltage, to the sensor, of the battery.

* * * * *